United States Patent
Grote et al.

(10) Patent No.: US 6,531,656 B1
(45) Date of Patent: Mar. 11, 2003

(54) SUPPLY LINE ALIGNMENT APPARATUS FOR SUPPLY COLUMN

(75) Inventors: James N. Grote, Batesville, IN (US); Thomas A. Stein, Hummelstown, PA (US); Thomas L. Ricks, Naperville, IL (US); Jay E. Fullenkamp, Sunman, IN (US); Donald E. Blanford, Greensburg, IN (US); Reinhard Starost, Batesville, IN (US); Bruce W. Smith, Lawrenceburg, IN (US)

(73) Assignee: Hill-Rom Services, Inc., Batesville, IN (US)

( * ) Notice: Subject to any disclaimer, the term of this patent is extended or adjusted under 35 U.S.C. 154(b) by 0 days.

(21) Appl. No.: 09/913,675

(22) PCT Filed: Jul. 23, 1999

(86) PCT No.: PCT/US99/16268

§ 371 (c)(1),
(2), (4) Date: Aug. 17, 2001

(87) PCT Pub. No.: WO01/07814

PCT Pub. Date: Feb. 1, 2001

(51) Int. Cl.$^7$ ................................................. H02G 3/04
(52) U.S. Cl. ........................... 174/48; 174/50; 174/54; 220/3.3
(58) Field of Search .............................. 174/48, 49, 50, 174/53, 54, 64, 47, 65 R; 220/3.2, 3.3, 3.6, 3.8, 241; 248/343, 56; 52/220.1, 220.3, 220.5, 220.7, 27; 138/103, 111

(56) References Cited

U.S. PATENT DOCUMENTS

| | | | | |
|---|---|---|---|---|
| 3,609,211 A | * | 9/1971 | Van Herk .................... | 174/49 |
| 3,610,810 A | * | 10/1971 | Fribley, Jr. .................. | 174/59 |
| 3,889,044 A | * | 6/1975 | Flachbarth et al. ........... | 174/48 |
| 3,909,502 A | * | 9/1975 | Lacan ......................... | 174/48 |
| 3,931,452 A | * | 1/1976 | Nilsson ....................... | 174/48 |
| 4,093,818 A | * | 6/1978 | Thwaites et al. ............. | 174/48 |
| 4,164,618 A | * | 8/1979 | Casasanta .................... | 174/48 |
| 4,284,840 A | * | 8/1981 | Baker ......................... | 174/48 |
| 4,307,436 A | * | 12/1981 | Eckert et al. ................. | 174/38 |
| 4,373,111 A | * | 2/1983 | Myers et al. ................. | 174/48 |
| 4,504,698 A | | 3/1985 | Greenwood | |
| 4,523,683 A | * | 6/1985 | Fullenkamp et al. ........ | 248/245 |
| 4,745,717 A | * | 5/1988 | Domigan ..................... | 174/48 |
| 5,243,153 A | * | 9/1993 | Holwerda .................... | 248/56 |
| 5,349,790 A | | 9/1994 | Beetles et al. | |
| 5,442,140 A | * | 8/1995 | Mc Grane .................. | 174/151 |
| 5,577,328 A | | 11/1996 | Kerry, Sr. | |
| 5,594,202 A | | 1/1997 | Tobias | |
| 5,644,876 A | * | 7/1997 | Walker ....................... | 52/220.7 |
| 5,800,028 A | * | 9/1998 | Smith et al. ................. | 174/50 |
| 5,902,960 A | * | 5/1999 | Smith ......................... | 220/241 |
| 6,017,228 A | * | 1/2000 | Verbeek et al. .............. | 174/49 |
| 6,359,217 B1 | * | 3/2002 | Thompson et al. .......... | 174/50 |

OTHER PUBLICATIONS

Hill–Rom, "EpiCare Ceiling Columns–Series CPT, CTL & CFX", 1997.

* cited by examiner

*Primary Examiner*—Anthony Dinkins
*Assistant Examiner*—Angel R. Estrada
(74) *Attorney, Agent, or Firm*—Barnes & Thornburg

(57) ABSTRACT

An alignment apparatus (28) is provided for use with a supply column (16) including an outer shell (22), a mount (12) configured to couple the outer shell (22) to a ceiling (14), and a plurality of supply lines (24) positioned within the outer shell (22). The supply lines (24) are configured to be coupled to at least one of an electrical supply and a gas supply. The alignment apparatus (28) includes a body member (30) configured to be positioned on the outer shell (22) of the supply column (16), and a plurality of ports (34, 36) formed in the body member (30). The ports (34, 36) are configured to support the supply lines (24) in a predetermined pattern.

26 Claims, 4 Drawing Sheets

SUPPLY LINE ALIGNMENT APPARATUS FOR SUPPLY COLUMN

CROSS REFERENCES TO RELATED APPLICATIONS

This application is a U.S. national counterpart application of international application Ser. No. PCT/US99/16268 filed Jul. 23, 1999.

BACKGROUND AND SUMMARY OF THE INVENTION

The present invention relates to a supply column configured for mounting to a ceiling and including a plurality of supply lines providing electricity and various gases to medical devices used in medical care facilities. More particularly, the present invention relates to an apparatus for supporting the supply lines during transportation of the supply column to a medical care facility.

Supply columns provide an organized supply of electricity and various gases to medical care areas such as hospital rooms, operating rooms, emergency rooms, and intensive care units. Supply columns include supply lines for electricity, various gases, and nitrogen control systems for power pneumatic tools. The supply lines typically supply for example, oxygen, air, nitrous oxide, nitrogen, carbon dioxide, helium and vacuum to the room. A typical supply column retains supply lines in a single organized supply head to avoid potential entanglement of the various supply lines and to protect the supply lines from damage.

Supply columns are mounted to ceilings and positioned where they are easily accessible but do not obstruct the working area of the care providers. Some supply columns have adjustable lengths to provide flexibility in positioning the supply head in the work area.

Supply columns are typically assembled at a manufacturing facility and transported to a medical care facility to be connected to a pre-installed ceiling mount. Installation of a supply column occurs in roughly two steps. First, the supply lines of the supply column are coupled to corresponding supply connectors located on the ceiling mount within the room. Then, bolts on the ceiling mount are coupled to brackets on the supply column -to secure the supply column to the ceiling.

The various gas and electrical connectors are coupled to the ceiling mount in a predetermined pattern at the manufacturing facility. The ceiling mount is then shipped to the medical care facility prior to shipping the remainder of the supply column. Therefore, the ceiling can be prepared and the ceiling mount can be installed in the room prior to receiving the supply column.

According to the present invention, a supply column includes a column body having an outer shell defining an interior region and an opening into the interior region, and a plurality of supply lines positioned within the interior region of the supply column to extend through the opening. An alignment apparatus of the present invention includes a body member and a plurality of ports. When the alignment apparatus is positioned over the opening of the supply column, each of the supply lines is positioned in a port in the alignment apparatus to support the supply lines during transportation of the supply column from the manufacturing facility to the care facility. Illustratively, the supply lines are positioned in selected ports so that each supply line is aligned with a respective connector on the ceiling mount that was previously shipped to the care facility. In other words, the ports in the alignment apparatus are aligned with connection locations on the ceiling mount so that the supply lines are held in an organized manner to facilitate coupling of the supply lines to the connectors on the ceiling mount.

Also according to the present invention, a method of installing a supply column onto a ceiling of a room is provided. The supply column includes an outer shell, a plurality of supply lines positioned within the outer shell, and a ceiling mount. The method includes the steps of installing the ceiling mount on the ceiling or the room, providing an alignment apparatus to align the plurality of supply lines in a predetermined pattern, locating the alignment apparatus on the outer shell of the supply column, connecting the plurality of supply lines to at least one of an electrical supply and gas supply, and coupling the outer shell to the ceiling mount.

Additional features of the present invention will become apparent to those skilled in the art upon consideration of the following detailed description of the, illustrated embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
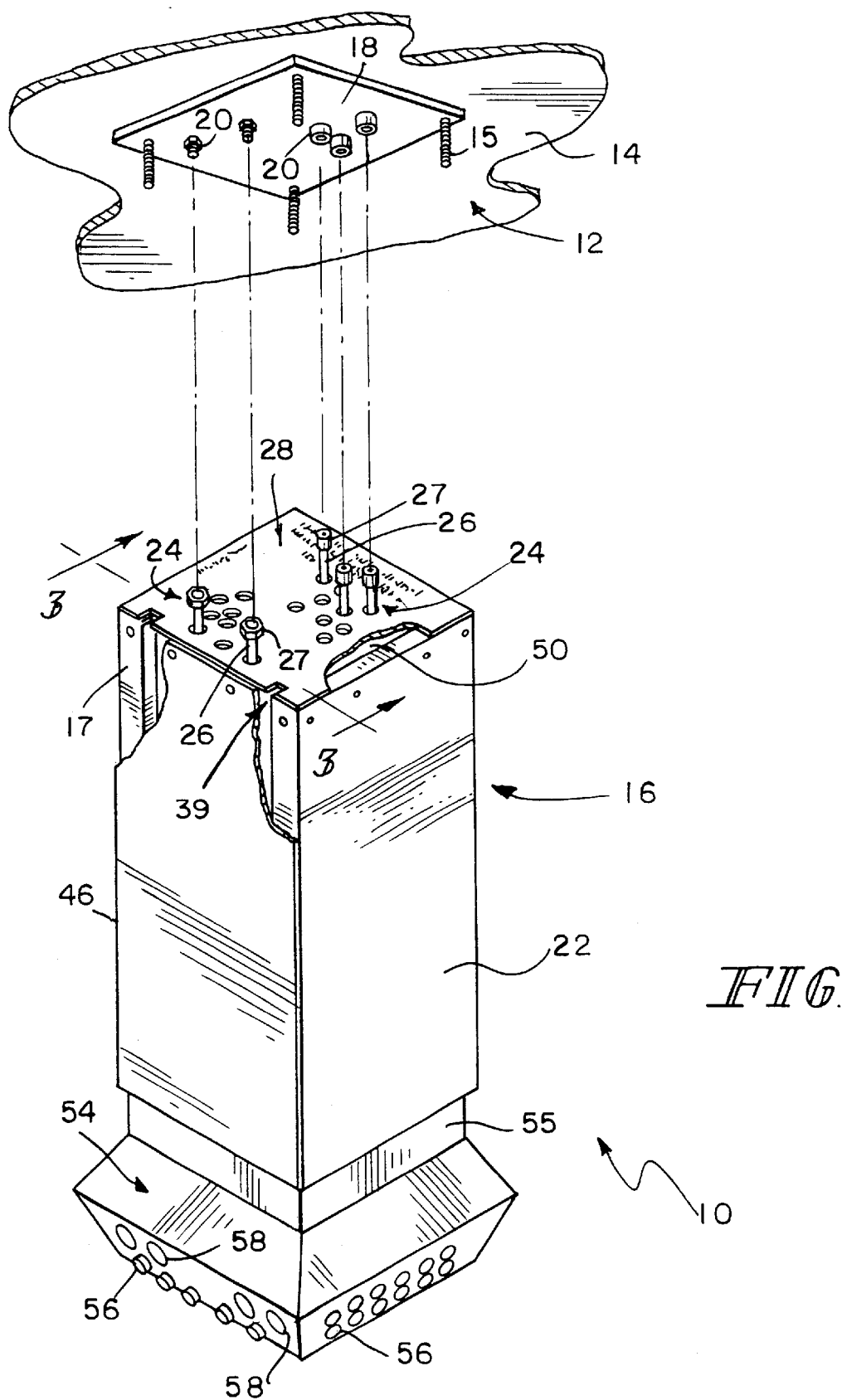
FIG. 1 is a perspective view of a gas and electrical supply apparatus including a ceiling mount coupled to a ceiling and having a plurality of male supply connectors extending therefrom, a supply column positioned below the ceiling mount and including an outer shell and a plurality of female supply connectors extending therefrom, and an alignment apparatus positioned on the supply column to support the plurality of female supply connectors in a predetermined position.

As shown in FIG. 1, a supply column 16 is provided to furnish an organized supply of electricity and various gases to medical care facilities. Illustratively, the supply column 16 supplies electricity and gases such as, for example, oxygen, air, nitrous oxide, nitrogen, carbon dioxide, helium, and vacuum to the room. In addition, data lines may be routed through the supply column 16, if desired.

Supply apparatus 10 includes a supply column 16, a ceiling mount 12 configured to support supply column 16 on a ceiling 14, and an alignment apparatus 28 positioned on supply column 16. As shown in FIG. 1, ceiling mount 12 is pre-installed on ceiling 14 and supply column 16 is positioned below ceiling mount 12 in preparation for installation on ceiling 14.

Figure 3:
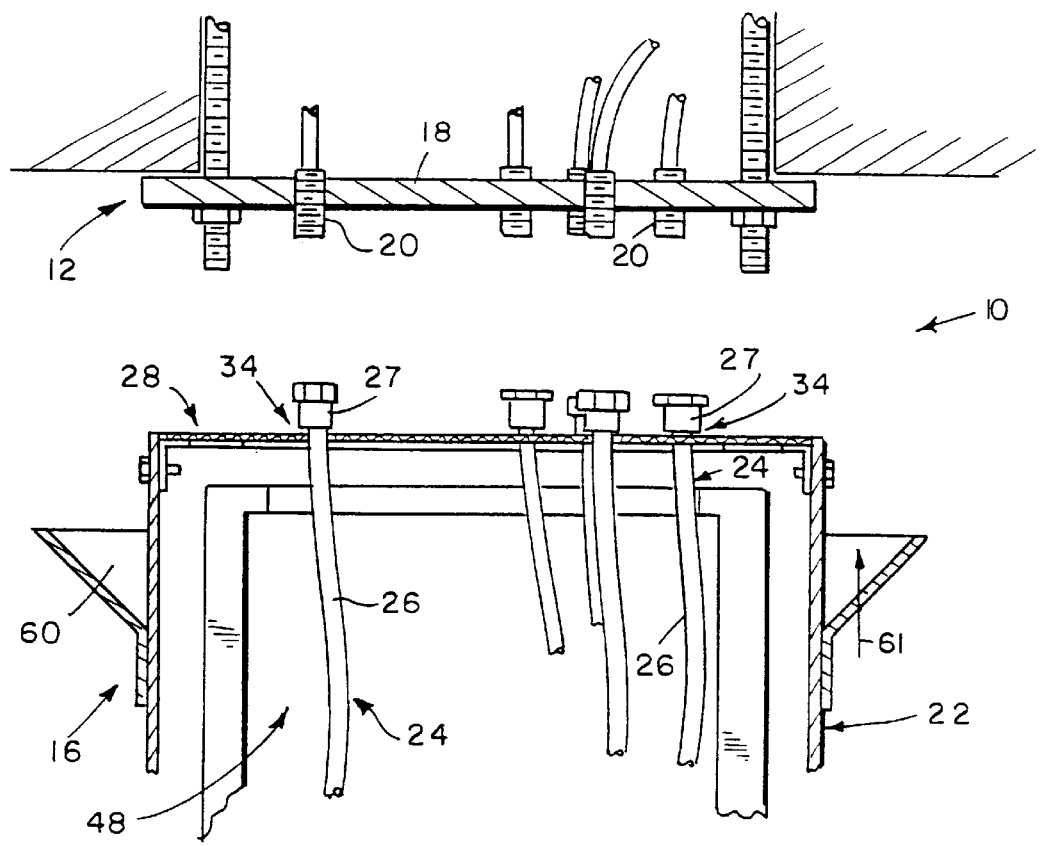
FIG. 3 is a cross-sectional view taken along line 3—3 of FIG. 1 showing the supply column positioned below the ceiling mount and the alignment apparatus positioned on the supply column to support the female supply connectors.

Supply column 16 includes a plurality of supply conduits 24 positioned within supply column 16 and a supply head 54 having a plurality of supply line outlets 56 and a plurality of supply controls 58 coupled to supply line outlets 56. Supply column 16 further includes a column body 46 having an outer shell 22, an interior region 48 defined by outer shell 22, an opening 50 into interior region 48, and a plurality of detents 39. An inner body portion 55 coupled to supply head 54 is movable in a telescoping manner from a retracted position shown in FIG. 1 to an extended position. Supply controls 58 of supply head 54 regulate the flow of gas or electricity carried by supply conduits 24. Supply conduits 24 are positioned within interior region 48 of supply column 16 for protection and extend through opening 50 to couple to ceiling mount 12 as shown in FIGS. 1 and 3.

Figure 2:
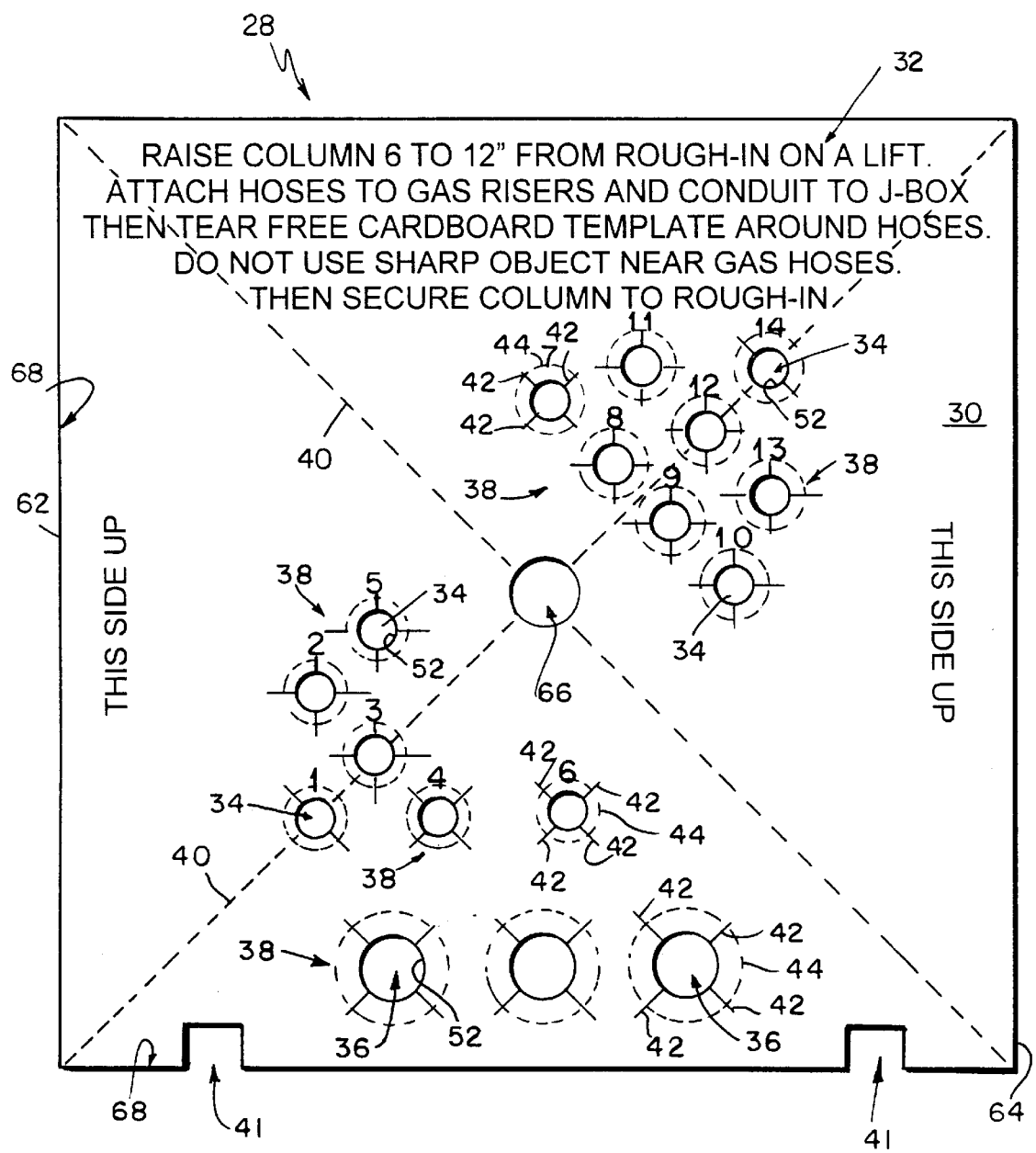
FIG. 2 is a top view of the alignment apparatus of FIG. 1 showing the alignment apparatus including a body member, instructions printed on the body member, a plurality of diagonal tear lines extending across the body member, a plurality of ports arranged in predetermined positions, and a plurality of reliefs positioned adjacent to the ports.

Alignment apparatus 28 is positioned over opening 50 of supply column 16 to align and support supply conduits 24 while supply column 16 is transported from the manufacturing facility until it is installed in a medical care facility. As shown in FIG. 2, alignment apparatus 28 includes a substantially flat body member 30, instructions 32 printed on body member 30, a central aperture 66, and a plurality of tear lines 40. Body member 30 also includes a perimeter edge 68, a plurality of alignment notches 41 in perimeter edge 68, a plurality of circular numbered openings or ports 34, and a plurality of circular main ports 36. Although FIG. 2 shows fourteen numbered ports 34 and three main ports 36, it is within the scope of this disclosure for the alignment apparatus 28 to include fewer or more numbered and main ports 34, 36. The ports 34, 36 may also have different sizes and shapes. Illustratively, medical gas supply lines are located in ports 34 and electrical supply lines are located in ports 36.

During manufacture of supply column 16, the male connectors 20 are connected to the ceiling mount 12 in a predetermined pattern. The connectors 20 are gas specific connectors which prevent connection of the wrong type of gas to the supply conduits 24. The female connectors 27 within the supply column 16 are 30 coupled to the ports 34, 36 of the alignment apparatus 28 in a predetermined pattern which matches the predetermined pattern of the male connectors 20 on the ceiling support 12. The numbers adjacent ports 34 help with installing the proper female connectors 27 in the predetermined pattern. The alignment apparatus 28 is then positioned over opening 50 of supply column 16, as shown in FIG. 1. Detents 39 of column body 46 are positioned in alignment notches 41 of alignment apparatus 28 to position alignment apparatus 28 on supply column 16 in a predetermined position relative to column body 46. When alignment apparatus 28 is positioned over opening 50, the body member 30 aligns and supports the supply conduits 24 in a predetermined arrangement that matches their installation orientation with ceiling mount 12.

As shown in FIG. 2, alignment apparatus 28 further includes a plurality of reliefs 38 positioned adjacent to numbered and main ports 34, 36 to provide expandability to ports 34, 36 for easier insertion of supply conduits 24 through ports 34, 36. Reliefs 38 include a plurality of relief cuts 42 extending from inner edges 52 of numbered and main ports 34, 36 out into a portion of the body member 30. Reliefs 38 further include a plurality of annular fold lines 44 positioned around inner edges 52 of numbered and main ports 34, 36 to provide hinge points for the reliefs 38. It is understood that the relief cuts 42 and fold lines 44 may have other orientations or configurations, if desired.

As shown in FIG. 1, ceiling mount 12 includes a mounting plate 18 and a plurality of male supply connectors 20 coupled thereto. As shown in FIG. 3, supply conduits 24 of supply column 16 include supply lines 26 and female supply connectors 27 coupled thereto. During transportation and installation of supply column 16, alignment apparatus 28 is positioned on supply column 16 to support supply lines 26 and to align female supply connectors 27 in the predetermined arrangement that corresponds with the arrangement of male supply connectors 20 as shown in FIG. 3.

Figure 4:
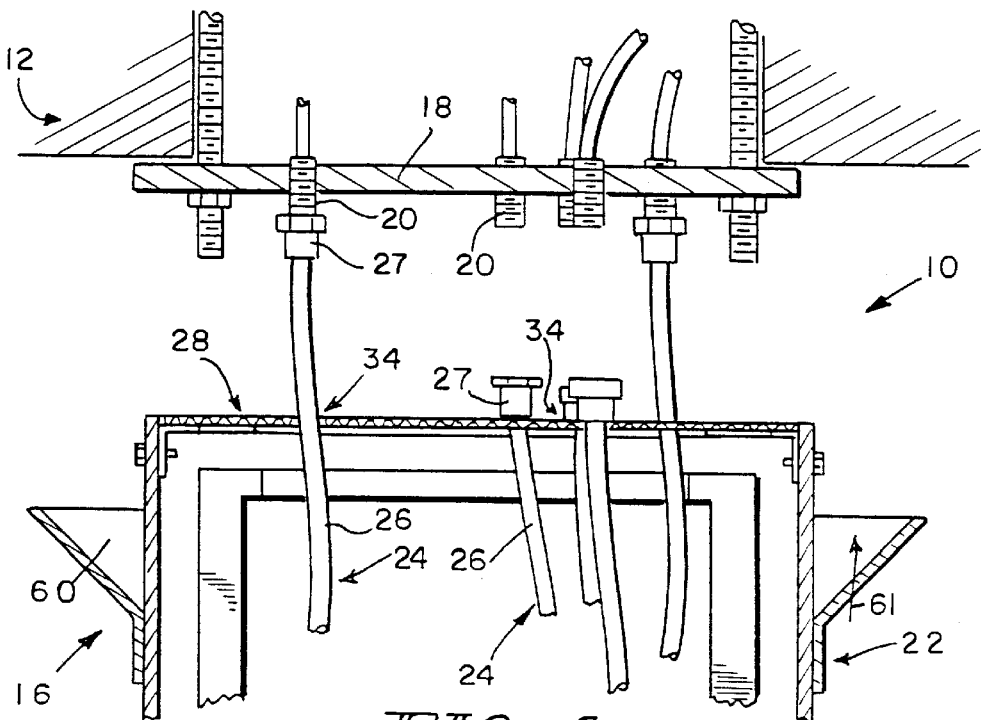
FIG. 4 is a cross-sectional view similar to FIG. 3 showing several of the female supply connectors coupled to the male supply connectors while the alignment apparatus continues to align and support the other female supply connectors.
Figure 5:
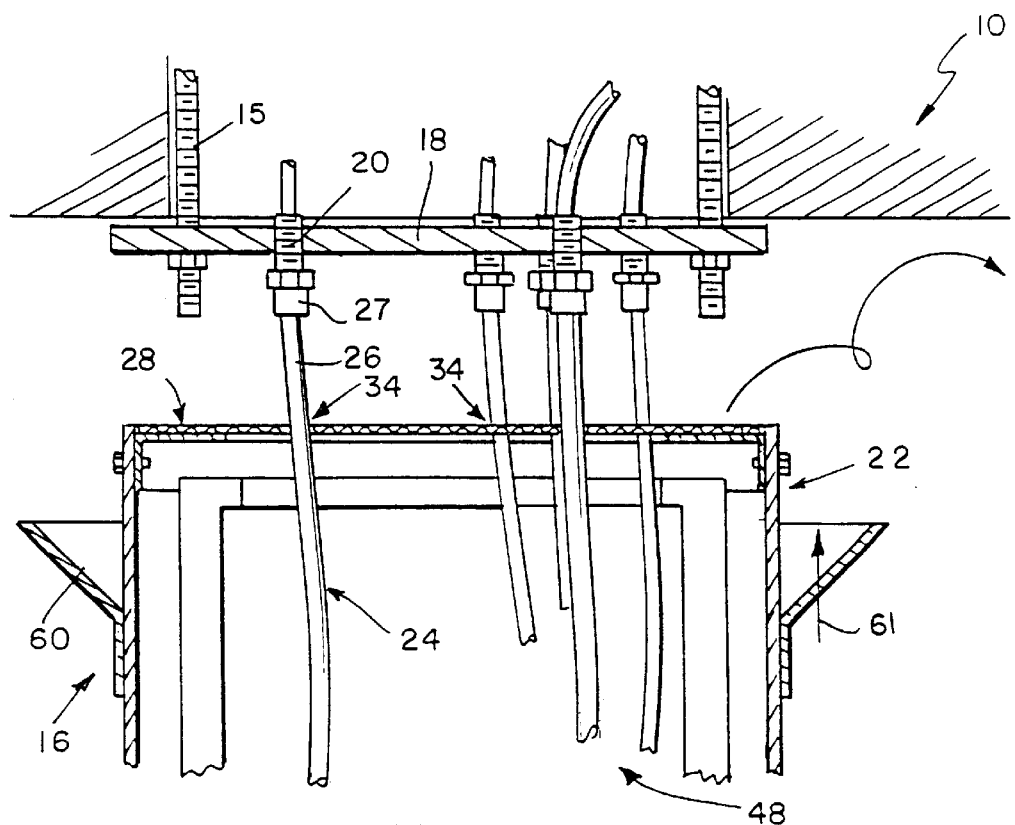
FIG. 5 is a cross-sectional view similar to FIG. 3 showing the female supply connectors coupled to the male supply connectors before removal of the alignment apparatus from the supply column.

As shown in FIG. 4, female supply connectors 27 are individually coupled to the corresponding male supply connectors 20 while alignment apparatus 28 supports the other female supply connectors 27 until all of the female supply connectors 27 are coupled to the corresponding male supply connectors 20 as shown in FIG. 5. Thus, alignment apparatus 28 supports supply conduits 24 in the predetermined arrangement during transportation of supply column 16 to avoid entanglement of supply lines 26 and aligns female supply connectors 27 with the corresponding male supply connectors 20 to facilitate alignment and connection of the female supply connectors 27 with the corresponding male supply connectors 20.

Figure 6:
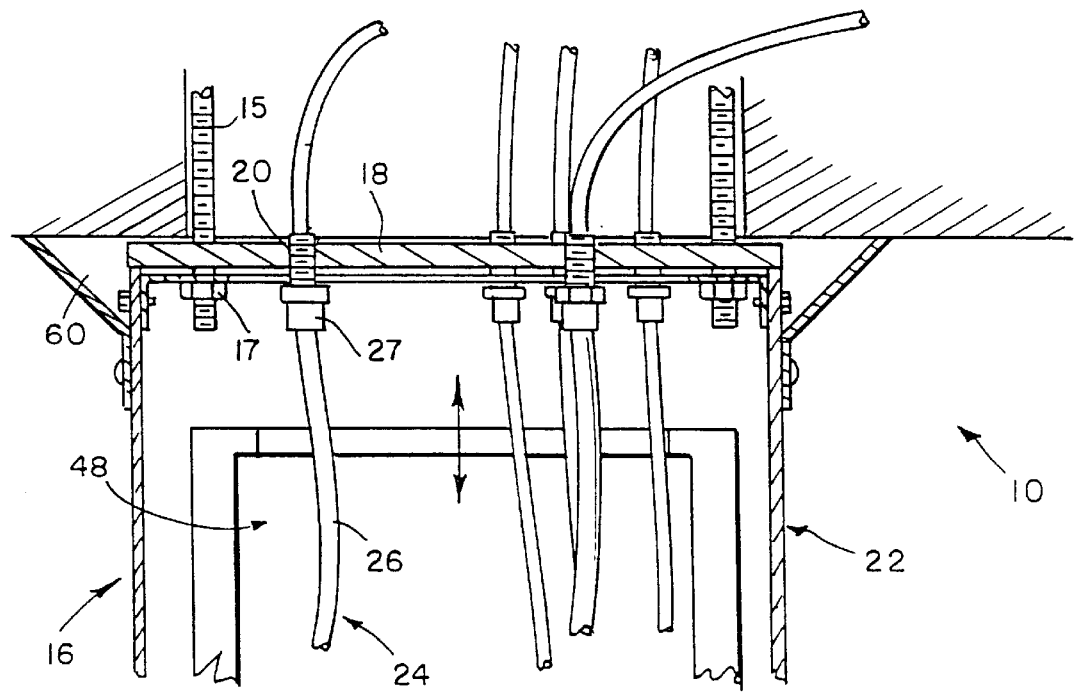
FIG. 6 is a cross-sectional view similar to FIG. 3 showing the supply column coupled to the ceiling mount and the alignment apparatus removed from the supply column.

After all female supply connectors 27 are coupled to the corresponding male supply connectors 20, supply column 16 is coupled to ceiling mount 12 as shown in FIG. 6. Ceiling mount 12 includes a plurality of bolts 15 coupled to mounting plate 18 as shown in FIG. 1. Supply column 16 includes a plurality of brackets 17 and a sleeve 60 to cover column body 46 adjacent to ceiling mount 12 as shown in FIG. 3.

Brackets 17 are coupled to bolts 15 of ceiling mount 12 to mount supply column 16 to ceiling mount 12. Then, sleeve 60 is moved in direction 61 to fit against ceiling mount 12 to cover bolts 15, female supply connectors 27, and male supply connectors 20 and provide a more pleasing appearance after supply column 16 is installed.

Before mounting supply column 16 to ceiling mount 12, alignment apparatus 28 is removed from between supply column 16 and ceiling mount 12 as shown in FIG. 6. To remove the alignment apparatus 28, body member 30 is torn along tear lines 40. To aid in tearing alignment apparatus 28, body member 30 of alignment apparatus 28 is illustratively made of cardboard. It is understood that other suitable materials may be used for the body member 30.

Although in the preferred embodiment alignment apparatus 28 includes two tear lines 40, it is within the scope of this disclosure for body member 30 to include fewer or more tear lines 40. Furthermore, although in the preferred embodiment alignment apparatus 28 includes diagonal tear lines 40 extending between the corners of body member 30, it is within the scope of this disclosure for tear lines 40 to be positioned in other configurations. For instance, in an alternative embodiment (not shown) tear line 40 extends between a first edge 62 and a second edge 64 of body member 30.

Although the invention has been described in detail with reference to certain illustrated embodiments, variations and modifications exist within the scope and spirit of the invention as described and as defined in the following claims.

What is claimed is:

1. A supply column apparatus comprising:
  a column body configured to define an interior region and an opening into the interior region;
  a plurality of supply lines positioned within the interior region of the column body and extending from the opening; and an alignment apparatus including a removable body member configured to be located adjacent the opening of the column body and a plurality of ports formed in the body member, each of the supply lines of the supply column being positioned in one of the ports to hold the supply lines in a predetermined pattern until the body member is removed.

2. The apparatus of claim 1, further comprising a ceiling mount configured to be coupled to a ceiling of a room, the ceiling mount including a plurality of first connectors arranged in a predetermined pattern, the plurality of first connectors being configured to be coupled to gas and electrical supplies, and wherein each of the supply lines includes a second connector, configured to be coupled to one of the first connectors on the ceiling mount, the predetermined pattern of the supply lines being configured to match the predetermined pattern of the first connectors on the ceiling mount to facilitate installation of the column body on to the ceiling mount.

3. The apparatus of claim 1, wherein the supply lines are configured to supply at least one of electricity, oxygen, air, nitrous oxide, nitrogen, carbon dioxide, helium and vacuum.

4. The combination of claim 1, wherein the alignment apparatus includes at least one relief positioned adjacent to one of the ports to provide expandability to said port.

5. The combination of claim 1, wherein the body member is made of a tearable material.

6. The combination of claim 1, wherein the column body includes a detent, the alignment apparatus is formed to include a notched portion and the detent positioned in the notched portion.

7. A supply column apparatus comprising:
a column body configured to define an interior region and an opening into the interior region;
a plurality of supply lines positioned within the interior region of the column body and extending from the opening; and
an alignment apparatus including a body member configured to be located adjacent the opening of the column body and a plurality of ports formed in the body member, each of the supply lines of the supply column being positioned in one of the ports to hold the supply lines in a predetermined pattern, wherein the alignment apparatus further includes at least one perforated tear line formed in the body member.

8. A supply column apparatus comprising:
a column body configured to define an interior region and an opening into the interior region;
a plurality of supply lines positioned within the interior region of the column body and extending from the opening; and
an alignment apparatus including a body member configured to be located adjacent the opening of the column body and a plurality of ports formed in the body member, each of the supply lines of the supply column being positioned in one of the ports to hold the supply lines in a predetermined pattern, wherein the column body includes a detent, the alignment apparatus is formed to include a notched portion and the detent is positioned in the notched portion, and wherein the body member includes a perimeter edge and the notched portion is formed in the perimeter edge.

9. An alignment apparatus for use with a supply column including an outer shell, a mount configured to couple the outer shell to a ceiling, and a plurality of supply lines positioned within the outer shell, the supply lines being configured to be coupled to at least one of an electrical supply and a gas supply, the alignment apparatus comprising a body member configured to be positioned on the outer shell of the supply column, and a plurality of ports formed in the body member, the ports being configured to support the supply lines in a predetermined pattern, wherein the body member includes first and second edges and the alignment apparatus further includes a tear line extending between the first and second edges.

10. An alignment apparatus for use with a supply column including an outer shell, a mount configured to couple the outer shell to a ceiling, and a plurality of supply lines positioned within the outer shell, the supply lines being configured to be coupled to at least one of an electrical supply and a gas supply, the alignment apparatus comprising a body member configured to be positioned on the outer shell of the supply column, and a plurality of ports formed in the body member, the ports being configured to support the supply lines in a predetermined pattern, wherein the alignment apparatus further includes a perforated tear line formed in the body member.

11. The apparatus of claim 10, wherein the body member includes a first corner and a second corner spaced apart from the first corner and the perforated tear line extends between the first and second corners.

12. An alignment apparatus for use with a supply column including an outer shell, a mount configured to couple the outer shell to a ceiling, and a plurality of supply lines positioned within the outer shell, the supply lines being configured to be coupled to at least one of an electrical supply and a gas supply, the alignment apparatus comprising a removable body member configured to be positioned on the outer shell of the supply column, and a plurality of ports formed in the body member, the ports being configured to support the supply lines in a predetermined pattern until the body member is removed prior to mounting the outer shell on the ceiling.

13. The apparatus of claim 12, wherein the alignment apparatus includes at least one relief positioned adjacent to one of the ports to provide expandability to said port.

14. The apparatus of claim 13, wherein the alignment apparatus further includes an inner edge defining one of the ports and the relief includes at least one relief cut formed in the body member and extending to the inner edge defining said port.

15. The apparatus of claim 14, wherein the relief includes a fold line formed in the body member and spaced apart from the inner edge.

16. The apparatus of claim 15, wherein the fold line is annular.

17. The apparatus of claim 12, wherein the body member is made of a tearable material.

18. The apparatus of claim 17, wherein the material is cardboard.

19. The apparatus of claim 12, wherein the body member includes a perimeter edge and the apparatus further includes a notch formed in the perimeter edge.

20. The apparatus of claim 12, further comprising labels located adjacent the ports on the body member to identify the ports.

21. The apparatus of claim 12, further comprising instructions written on the body portion.

22. An alignment apparatus for use with a supply column including an outer shell, a mount configured to couple the outer shell to a ceiling, and a plurality of supply lines positioned within the outer shell, the supply lines being configured to be coupled to at least one of an electrical supply and a gas supply, the alignment apparatus comprising a body member configured to be positioned on the outer shell of the supply column, and a plurality of ports formed in the body member, the ports being configured to support the supply lines in a predetermined pattern, wherein the alignment apparatus includes a first tear line and a second tear line crossing the first tear line.

23. A method of installing a supply column onto a ceiling of a room, the supply column including an outer shell, a plurality of supply lines positioned within the outer shell, and a ceiling mount, the method comprising the steps of:

installing the ceiling mount on the ceiling of the room;

providing an alignment apparatus to align the plurality of supply lines in a predetermined pattern;

locating the alignment apparatus on the outer shell of the supply column;

connecting the plurality of supply lines to at least one of an electrical supply and gas supply;

removing the alignment apparatus; and coupling the outer shell to the ceiling mount.

24. The method of claim 23, further comprising the step of transporting the supply column from a manufacturing facility to a care facility between the step of locating the alignment apparatus on the outer shell and the connecting step.

25. The method of claim 23, wherein the removing step includes tearing the alignment apparatus.

26. A method of installing a supply column onto a ceiling of a room, the supply column including an outer shell, a plurality of supply lines positioned within the outer shell, and a ceiling mount, the method comprising the steps of:

installing the ceiling mount on the ceiling of the room;

providing an alignment apparatus to align the plurality of supply lines in a predetermined pattern;

locating the alignment apparatus on the outer shell of the supply column;

connecting the plurality of supply lines to at least one of an electrical supply and gas supply;

coupling the outer shell to the ceiling mount, installing a plurality of first connectors arranged in a predetermined pattern on the ceiling mount prior to the installing step, and providing a plurality of second connectors coupled to the plurality of supply lines, the alignment apparatus aligning the second connectors in substantially the same predetermined pattern as the first connectors on the ceiling mount to facilitate connection of the first and second connectors during the connecting step.

* * * * *